US009838514B2

(12) United States Patent
Adachi et al.

(10) Patent No.: US 9,838,514 B2
(45) Date of Patent: Dec. 5, 2017

(54) RADIO COMMUNICATION SYSTEM, RADIO APPARATUS, RADIO COMMUNICATION METHOD, PACKET GENERATION METHOD, AND METHOD FOR REPRODUCING DATA FROM PACKET

(71) Applicant: ICOM INCORPORATED, Osaka (JP)

(72) Inventors: Shinichirou Adachi, Osaka (JP); Keisuke Hosokawa, Osaka (JP)

(73) Assignee: ICOM INCORPORATED, Osaka (JP)

( * ) Notice: Subject to any disclaimer, the term of this patent is extended or adjusted under 35 U.S.C. 154(b) by 129 days.

(21) Appl. No.: 15/046,809

(22) Filed: Feb. 18, 2016

(65) Prior Publication Data

US 2016/0248892 A1 Aug. 25, 2016

(30) Foreign Application Priority Data

Feb. 19, 2015 (JP) ................................. 2015-030809

(51) Int. Cl.
*H04L 29/06* (2006.01)
*H04L 29/08* (2006.01)
*G10L 19/16* (2013.01)

(52) U.S. Cl.
CPC .............. *H04L 69/22* (2013.01); *H04L 67/10* (2013.01); *G10L 19/167* (2013.01)

(58) Field of Classification Search
CPC ......... H04L 69/22; H04L 65/00; H04L 67/10; H04L 1/0048; H04L 1/006; H04L 1/0065; H04L 1/0071; H04W 72/005; H04W 84/20; H04W 4/10; G10L 19/167; G10L 19/22; G10L 19/008; G10L 19/00; G10L 21/00
USPC .......................................................... 370/474
See application file for complete search history.

(56) References Cited

U.S. PATENT DOCUMENTS

| 6,449,352 | B1 * | 9/2002 | Takahashi ............... H04L 29/06 375/E7.022 |
| 2007/0022208 | A1 * | 1/2007 | Hashimoto ............ H04N 5/782 709/231 |
| 2009/0208219 | A1 * | 8/2009 | Rhodes .................. H04B 13/02 398/104 |

(Continued)

FOREIGN PATENT DOCUMENTS

JP 2006-157477 * 6/2006 ........... H04L 12/951

*Primary Examiner* — Asfar M Qureshi
(74) *Attorney, Agent, or Firm* — Wenderoth, Lind & Ponack, L.L.P.

(57) ABSTRACT

In a radio apparatus that can simultaneously perform audio communication and data communication, the amount of data for data communication that can be transmitted during a single call is increased, and the communication speed of data communication is thereby increased. A transmission unit generates a packet in which an audio frame and a data frame, are consecutively arranged one after another. When receiving a transmission start command from a controller the transmission unit generates a packet in which data of an audio signal is inserted in the audio frame and data for data communication is inserted in the data frame, and when receiving a mode change command from the controller, the transmission unit generates and transmits, during a fixed time period from reception of the command, a packet in which data for data communication is inserted in the audio frame and the data frame.

8 Claims, 7 Drawing Sheets

(56) References Cited

U.S. PATENT DOCUMENTS

2010/0110078 A1\* 5/2010 Yanai .................... G06T 11/206
                                                      345/440
2016/0247505 A1\* 8/2016 Adachi .................. H04L 69/22
2016/0249251 A1\* 8/2016 Hosokawa ............. H04L 65/00

\* cited by examiner

RADIO COMMUNICATION SYSTEM, RADIO APPARATUS, RADIO COMMUNICATION METHOD, PACKET GENERATION METHOD, AND METHOD FOR REPRODUCING DATA FROM PACKET

CROSS REFERENCE TO RELATED APPLICATIONS

The disclosure of Japanese Patent Application serial No. 2015-30809, filed on Feb. 19, 2015, including the specification, drawings and abstract is incorporated herein by reference in its entirety.

BACKGROUND OF THE INVENTION

Field of the Invention

The present invention relates to a radio communication system employing digital audio communication, a radio apparatus used in the system, and a radio communication method, a packet data generation method, and a method for reproducing data from a packet, that correspond to the system.

Description of the Related Art

In recent years, a digitized and networked environment for audio communication has been developing in the field of amateur radio for example, so that the users can enjoy communication at a higher speed and exchange clearer audio messages. In a radio communication system employing such digital audio communication, audio signals are encoded and converted into digital signals, and are transmitted after being packetized (for example, see JP 2006-157477A).

In the aforementioned radio communication system, data indicating a call sign of the transmission destination, data indicating a call sign of the transmission source, etc. are added to the header part of the packet, and accordingly the system can achieve many functions such as the function of performing communication with the designation of the communication party radio station, which cannot be achieved by analogue radio communication systems.

Furthermore, according to the aforementioned radio communication system, audio frames and data frames, each having a predetermined length, are consecutively arranged one after the other, so that data for audio communication and data for data communication can be simultaneously transmitted.

Therefore, with use of this function, image signals captured by a camera can be transmitted from one radio apparatus to another radio apparatus during communication, and the image is displayed on a display and the users can enjoy a conversation while viewing the image, for example.

Meanwhile, since the aforementioned radio communication system is designed for audio communication, the amount of data that can be transmitted in data communication is set to be smaller than the amount of data that can be transmitted by audio communication, and accordingly the communication speed of the data communication is not necessarily high.

Therefore, only some of the image signals can be transmitted during a single call, and users cannot enjoy a conversation while viewing the image. For this reason, improvements have been demanded by users.

BRIEF SUMMARY OF THE INVENTION

The present invention is made in view of these conventional problems, and aims to provide a radio communication system that utilizes audio frames after the disconnection of audio signal transmission, and thereby increases the amount of data for data communication that can be transmitted during a single call.

To achieve the aim above, a radio communication system according to the present invention is a radio communication system including at least two radio apparatuses, each radio apparatus comprising:
a transmission unit configured to generate a packet including: a header part containing data of an identifier identifying at least a transmission destination radio station and a transmission source radio station; and a data part in which an audio frame and a data frame, each having a predetermined length, are consecutively arranged one after another, the data frame further having a mini-header inserted therein, in which information indicating a type of data is written, and to convert the packet into a radio signal and transmit the radio signal;

a reception unit configured to receive the radio signal, reproduce a packet from the radio signal, and retrieve data from the packet;

an audio codec configured to generate a digital audio signal by performing A/D conversion and encoding on an analogue audio signal and thereafter transmit the digital audio signal to the transmission unit, and to reproduce an analogue audio signal by performing decoding and D/A conversion on a digital audio signal received from the reception unit; and a controller configured to instruct the transmission unit to generate a packet, and to instruct the reception unit to reproduce a packet from a received radio signal, wherein, when receiving from the controller a first command to start transmission, the transmission unit of a radio apparatus serving as a sender generates a packet in which data of an audio signal output from the audio codec is inserted in the audio frame and data for data communication is inserted in the data frame, when receiving from the controller a second command to change a mode of a packet in response to an end of a call, the transmission unit of the radio apparatus serving as the sender generates, during a fixed time period from reception of the second command, a packet in which data for data communication is inserted in the audio frame and the data frame, the controller of a radio apparatus serving as a recipient, which has received a radio signal, analyzes the information inserted in the mini-header retrieved from the packet reproduced by the reception unit, to determine the type of data inserted in the audio frame, and the reception unit retrieves data from the packet according to a result of the determination made by the controller, and reproduces the audio signal or the data for data communication.

A radio apparatus according to the present invention is a radio apparatus comprising:

a transmission unit configured to generate a packet including: a header part containing data of an identifier identifying at least a transmission destination radio station and a transmission source radio station; and a data part in which an audio frame and a data frame, each having a predetermined length, are consecutively arranged one after another, the data frame further having a mini-header inserted therein, in which information indicating a type of data is written, and to convert the packet into a radio signal and transmit the radio signal;

an audio codec configured to generate a digital audio signal by performing A/D conversion and encoding on an analogue audio signal and thereafter transmit the digital audio signal to the transmission unit; and a controller configured to instruct the transmission unit to generate a packet, wherein, when receiving from the controller a first command to start transmission, the transmission unit generates a packet in which data of an audio signal output from the audio codec is inserted in the audio frame and data for data communication is inserted in the data frame, and when receiving from the controller a second command to change a mode of a packet in response to an end of a call, the transmission unit generates, during a fixed time period from reception of the second command, a packet in which data for data communication is inserted in the audio frame and the data frame.

A radio communication method according to the present invention is a radio communication method for a radio communication system including at least two radio apparatuses, one of the radio apparatuses being configured to generate a packet including: a header part containing data of an identifier identifying at least a transmission destination radio station and a transmission source radio station; and a data part in which an audio frame and a data frame, each having a predetermined length, are consecutively arranged one after another, the data frame further having a mini-header inserted therein, in which information indicating a type of data is written, and to convert the packet into a radio signal and transmit the radio signal, and another one of the radio apparatuses being configured to receive a radio signal and reproduce a packet from the radio signal, the radio communication method comprising the steps of:

with a radio apparatus serving as a sender, when transmission starts, generating a packet in which data of an audio signal is inserted in the audio frame and data for data communication is inserted in the data frame;

during a fixed time period from when a call ends, generating a packet in which data for data communication is inserted in the audio frame and the data frame; and converting the generated packet to a radio signal and transmitting the radio signal, and with a radio apparatus serving as a recipient, receiving the radio signal;

reproducing a packet from the received radio signal;

analyzing the information inserted in the mini-header retrieved from the reproduced packet to determine the type of data inserted in the audio frame; and retrieving data from the packet according to a result of the determination, and reproducing the audio signal or the data for data communication.

A packet generation method according to the present invention is a packet generation method for a radio apparatus that communicates with another radio apparatus by using a packet including: a header part containing data of an identifier identifying at least a transmission destination radio station and a transmission source radio station; and a data part in which an audio frame and a data frame, each having a predetermined length, are consecutively arranged one after another, the data frame further having a mini-header inserted therein, in which information indicating a type of data is written, the packet generation method comprising the steps of:

when transmission starts, generating a packet in which data of an audio signal is inserted in the audio frame and data for data communication is inserted in the data frame; and during a fixed time period from when a call ends, generating a packet in which data for data communication is inserted in the audio frame and the data frame.

A method for reproducing data from a packet according to the present invention is a method for reproducing data from a packet performed by a radio apparatus configured to receive a radio signal containing a packet generated by the above-described packet generation method, to reproduce the packet from the radio signal, and to retrieve data from the packet, the method comprising the steps of:

analyzing the information inserted in the mini-header retrieved from the reproduced packet to determine the type of data inserted in the audio frame; and retrieving data from the packet according to a result of the determination and reproducing the audio signal or the data for data communication.

By using the radio communication system according to the present invention, during the fixed time period from when the transmission unit receives the command that is output from the controller in response to the PTT switch being turned OFF, data for data communication, instead of data for audio communication, is inserted into the audio frames of a packet, and thus the amount data for data communication that can be transmitted during a single call can be increased, which results in the increase of the communication speed of data communication.

Also, the functions realized by the above-described radio communication system can be realized by the radio apparatus, the radio communication method, the packet generation method, and the method for reproducing data from a packet according to the present invention, using a similar configuration or method.

These and other objects, features and advantages of the present invention will become more apparent upon reading of the following detailed description along with the accompanied drawings.

DETAILED DESCRIPTION OF THE INVENTION

The following describes a radio communication system according to an embodiment of the present invention, with reference to the drawings.

Configuration of Radio Apparatus

Figure 1:
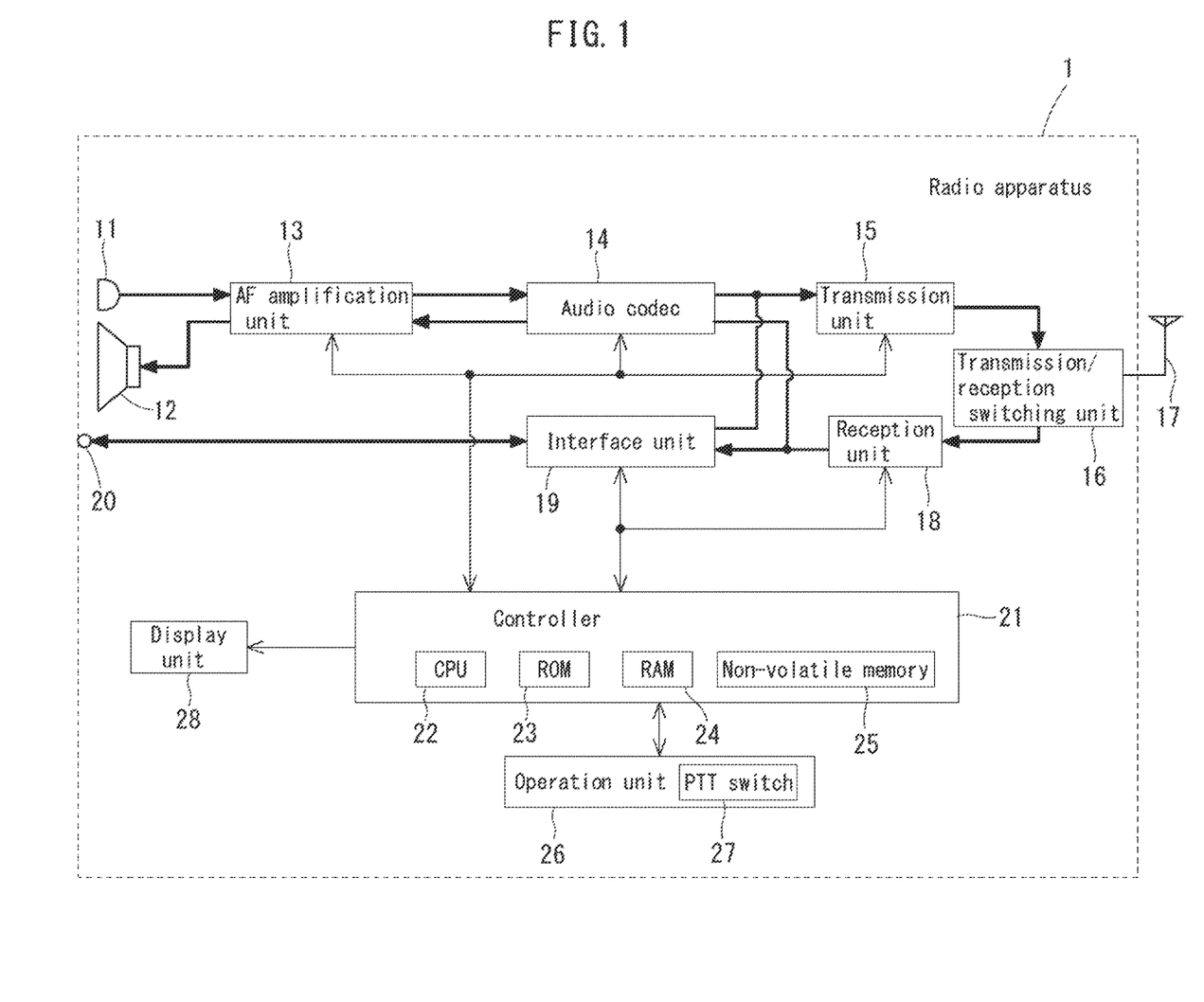
FIG. 1 is a block diagram showing a configuration of a radio apparatus used in a radio communication system according to an embodiment of the present invention.

A radio apparatus used in a radio communication system according to the present embodiment is illustrated in FIG. 1. A radio apparatus 1 includes a microphone 11, a speaker 12, an AF amplification unit 13, an audio codec 14, a transmission unit 15, a transmission/reception switching unit 16, an antenna 17, a reception unit 18, an interface unit 19, a controller 21, an operation unit 26, and a display unit 28. In the drawing, thick arrows indicate the flow of an audio signal, data, etc., and thin arrows indicate the flow of a control system signal.

The microphone 11 generates an analogue audio signal from an audio input for transmission, and outputs the audio signal to the AF amplification unit 13. The speaker 12 converts an analogue audio signal output from the AF amplification unit 13, to a sound.

The AF (Audio Frequency) amplification unit 13 amplifies an analogue audio signal input from the microphone 11, and supplies the resultant signal to the audio codec 14. The AF amplification unit 13 also amplifies an analogue audio signal of a received sound supplied from the audio codec 14, and outputs the resultant signal to the speaker 12.

The audio codec 14 performs an A/D (analogue/digital) conversion and encoding on an analogue audio signal supplied from the AF amplification unit 13, and outputs the resultant signal to the transmission unit 15. The audio codec 14 also decodes, and furthermore performs a D/A (digital/analogue) conversion on, a digital audio signal supplied from the reception unit 18, and outputs the resultant signal to the AF amplification unit 13.

Figure 2:
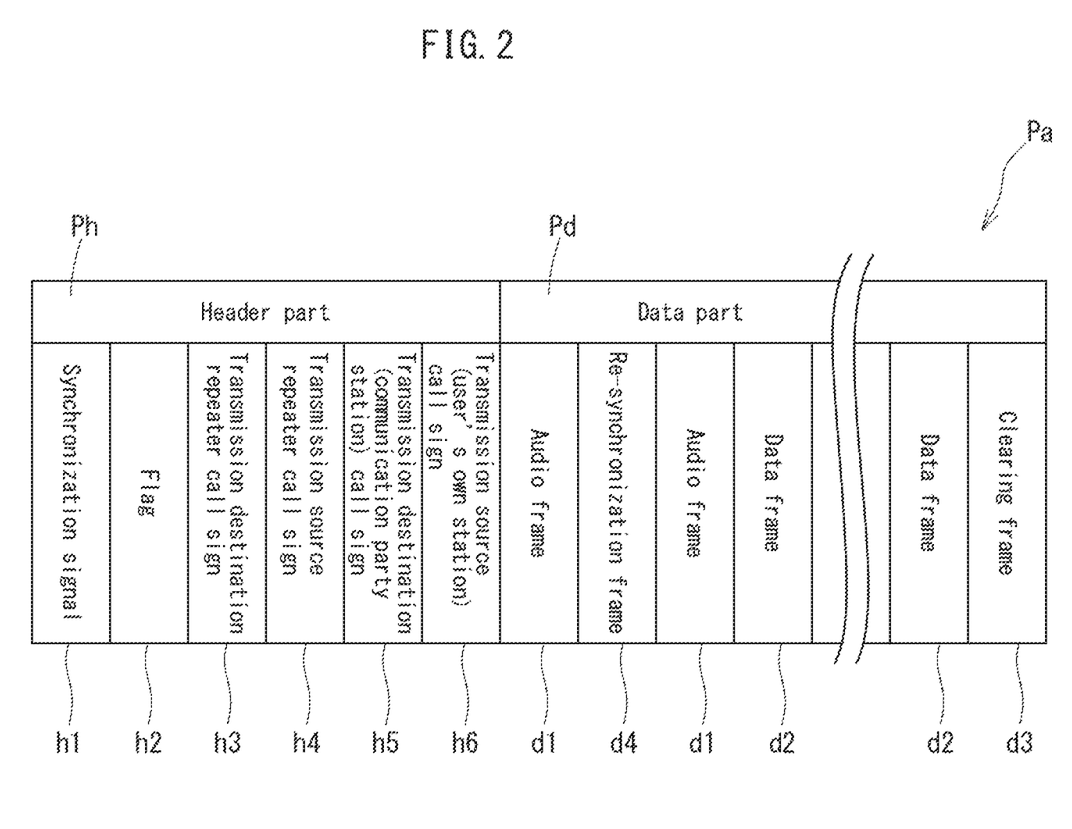
FIG. 2 is a diagram showing a configuration of a packet transmitted by the radio apparatus.

The transmission unit 15 generates a packet for transmission as shown in FIG. 2 by adding a header for radio communication to a digital audio signal supplied from the audio codec 14, and also dividing the digital audio signal based on an output from a PTT switch 27 described later. The configuration of the packet will be described later in detail, with reference to FIG. 2. The transmission unit 15 furthermore modulates a carrier wave by using digital data constituting the packet, performs a frequency conversion as necessary, and transmits the resultant wave from the antenna 17 via the transmission/reception switching unit 16.

The transmission/reception switching unit 16 delivers the transmission signal from the transmission unit 15 to the antenna 17 when the PTT switch 27 is pressed and turned ON, and delivers the reception signal of the antenna 17 to the reception unit 18 when the PTT switch 27 is released and turned OFF.

The reception unit 18 switches the reception frequency according to an instruction signal from the controller 21, amplifies the reception signal obtained in synchronization with the reception frequency, and furthermore, demodulates the resulting signal to reproduce a packet. Then, the reception unit 18 removes the header part from the reproduced packet, and supplies the audio data to the audio codec 14 and supplies the other data (e.g., packet data of an image signal, etc.) to the interface unit 19.

The interface unit 19 is connected to an external device not shown in the drawing (e.g., a personal computer or a smartphone) via an external connection terminal 20, and supplies packet data supplied from the external device, such as an image signal, to the transmission unit 15 and the controller 21. The interface unit 19 also supplies packet data supplied from the reception unit 18, to the external device via the external connection terminal 20.

The controller 21 controls the operation of the radio apparatus 1. The controller 21 includes a CPU (Central Processing Unit) 22, a ROM (Read Only Memory) 23 storing a program defining the operation of the CPU 22, a RAM (Random Access Memory) 24 serving as a work memory for the CPU 22, and a non-volatile memory 25 storing data such as a call sign.

The operation unit 26 conveys various sorts of inputs and user instructions to the controller 21. The operation unit 26 includes the PTT (Push To Talk) switch 27. When the PTT switch 27 is pressed (turned ON), the transmission/reception switching unit 16 switches to the transmission mode and a transmission from the antenna 17 is performed, and when the PTT switch 27 is released (turned OFF), the transmission/reception switching unit 16 switches to the reception mode and the reproduction of the received audio signal is performed.

The display unit 28 includes a liquid crystal display or the like, and is used for displaying various sorts of data. The screen of the display unit 28 displays, for example, information indicating that the radio apparatus 1 has received amateur radio signals (there has been a call), or call signs and nicknames of the transmission source (the user's own station) and the transmission destination (the communication party station).

Packet Configuration

Figure 3:
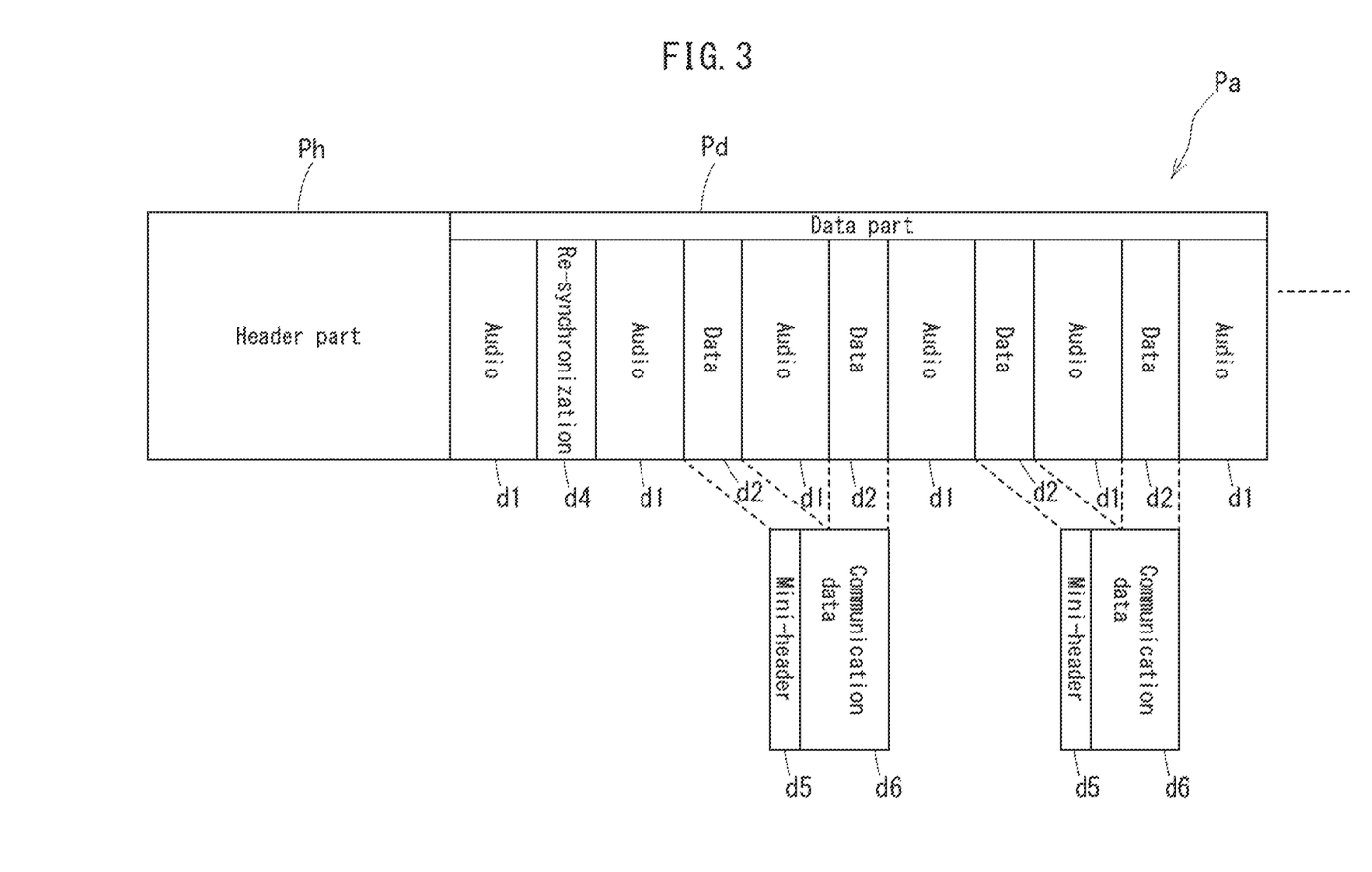
FIG. 3 is a diagram showing types of data to be inserted in frames of the data part of a packet.

Next, with reference to FIG. 2 and FIG. 3, a description is given of the configuration of a packet generated by the transmission unit 15. The configuration of the packet shows the order and the grouping of a series of data pieces to be transmitted in digital audio communication.

As shown in FIG. 2, a packet Pa includes a header part Ph and a data part Pd. The header part Ph includes a synchronization signal h1, a flag h2, a transmission destination repeater call sign h3, a transmission source repeater call sign h4, a transmission destination call sign h5, and a transmission source call sign h6.

The synchronization signal h1 in the header part Ph is used for synchronization with the reception signal, and indicates the starting point of the signal. The flag h2 is data for indicating communication via a repeater, direct communication, a repeater control signal, etc., and is composed of a plurality of bits of data.

The transmission destination repeater call sign h3 is, for example, the call sign of a repeater within the repeater area to which the transmission destination radio station belongs, and the transmission source repeater call sign h4 is a call sign of a repeater within the repeater area to which the transmission source radio station belongs. The transmission destination call sign h5 is the call sign of the communication party station at the destination of the transmission, and the transmission source call sign h6 is the call sign of the user's own station. These call signs (h3 to h6) serve as identifiers for identifying the radio stations at the transmission destination and the transmission source, as well as the repeater stations that relay the radio signals. Note that the transmission destination call sign h5 may be CQ for making a call without the designation of any particular station.

In order to achieve the simultaneous transmission of data for audio communication and data for data communication, the data part Pd includes audio frames d1 and data frames d2, which are arranged one after the other, and a clearing frame d3 is attached to the end. Each of the audio frames d1 has a predetermined length, and a digitized audio signal is inserted into it. Each of the data frames d2 has a predetermined length, and data sets for data communication such as an image signal or a message are inserted into it. The clearing frame d3 indicates the end of the packet.

Note that the data frames d2 are periodically replaced with a resynchronization frame d4 (e.g. every 420 ms). A synchronization signal for synchronization with the radio apparatus of the communication party station is inserted into each resynchronization frame d4.

Next, with reference to FIG. 3, a description is given of data for data communication, which is to be inserted into the data frames d2. FIG. 3 shows the types of data to be inserted into each frame of the data part Pd. In this drawing, "audio" shows that an audio signal is inserted in the frame, and "data" shows that data for data communication is inserted in the frame.

Regarding the audio frames d1 and the data frames d2 constituting the data part Pd, the data amount of the audio frames d1 is set to be greater than the data mount of the data frames d2, because the transmission of audio signal data is given a high priority. Usually, 9 bytes of data is inserted into each of the audio frames d1, and 3 bytes of data is inserted into each of the data frames d2.

Furthermore, a mini-header d5, which includes the description of the data type, etc., is inserted in the beginning of the data frame d2. However, if the mini-header d5 is provided in every data frame, the amount of data that can be inserted in the data frame will be smaller, and therefore usually one mini-header d5 is inserted in one data frame out of every two data frames.

Therefore, as shown in the lower level of FIG. 3, when generating the packet Pa, communication data d6 for data communication is divided into 5-byte portions, and 1-byte mini-header d5 is added to the beginning of each portion so as to compose a data block, and after that, the data block is divided into 3-byte portions, and these portions are respectively inserted into two adjacent data frames d2.

Then, information indicating the data type and the data length is written into each mini-header d5. The data length indicates the length of the effective data inserted in a single data block. For example, consider the case of transmitting general-purpose data having a data length of 13 bytes, such as image data. First, when the data to be transmitted is divided into 5-byte portions as described above, the data will be divided into three portions, namely a 5-byte portion, a 5-byte portion, and a 3-byte portion. Then, the mini-header d5 is added to the beginning of each of these data portions. Here, if the information indicating the general-purpose data such as image data is 0x3 for example, the mini-header d5 added to each of the first and second data blocks is 0x35, and the mini-header d5 added to the third data block is 0x33.

The controller 21 (see FIG. 1) retrieves, via the interface unit 19, the data indicating the data type, etc., from the data for data communication transmitted from an external device (not shown in the drawings), and stores the retrieved data to the RAM 24. Also, when the transmission unit 15 generates packets for transmission, the controller 21 reads the aforementioned data from the RAM 24 and transfers it to the transmission unit 15. The transferred data is written into the mini-header d5.

Meanwhile, when reproducing the data for data communication from the packets Pa reproduced by the reception unit 18, the reverse of the aforementioned process is performed, i.e., based on the information in the mini-header d5, a 5-byte communication data portion is retrieved from the data contained in two data frames d2, the data for data communication is reproduced by concatenating the 5-byte communication data portions with each other, and the data for data communication is transmitted to an external device connected to the terminal 20, via the interface unit 19.

Communication Operations by Radio Apparatus

Figure 4:
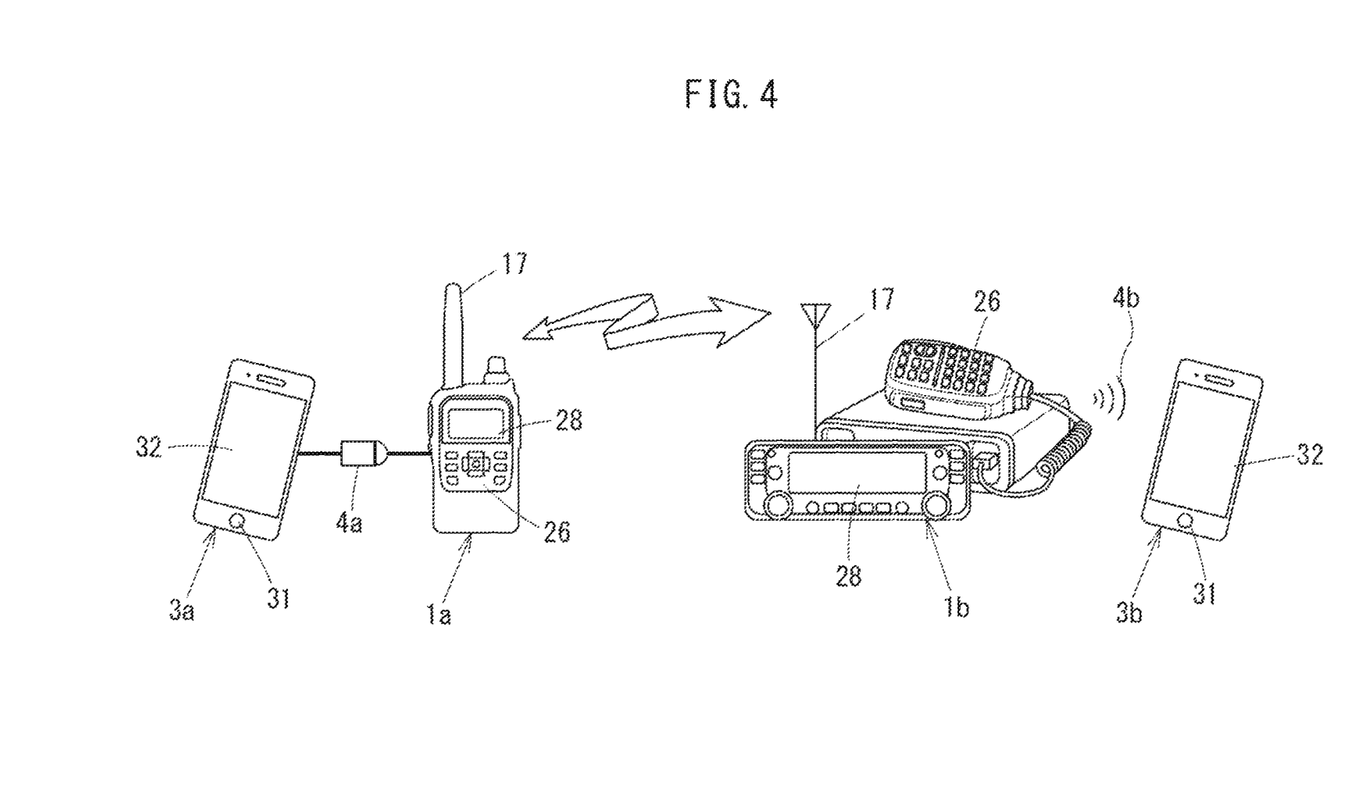
FIG. 4 is a diagram showing a representative usage mode of a radio communication system using the radio apparatus according to the embodiment.

Next, with reference to FIG. 4 and above-described FIGS. 1 to 3, a description is given of communication operations using a radio apparatus according to the present embodiment, which can simultaneously perform audio communication and data communication.

FIG. 4 shows a representative usage mode of a radio communication system using the radio apparatus shown in FIG. 1. A smartphone 3a is connected to a portable radio apparatus 1a via a USB cable 4a.

The smartphone 3a is a sort of multifunctional mobile phone, and is capable of displaying images captured by a built-in camera 31 on the screen of a display 32. The smartphone 3a has the function of exchanging data for data communication, which includes image signals, with the radio apparatus 1a.

Meanwhile, an on-board radio apparatus 1b is connected to a smartphone 3b via a Bluetooth 4b, which is a sort of short-range radio communication. The radio apparatus 1b and the smartphone 3b are each equipped with a communication module complying with the Bluetooth standard, and are capable of exchanging data via radio.

By using the radio communication system shown in FIG. 4, it is possible to transmit images captured by the camera 31 of the smartphone 3a to the smartphone 3b via the radio apparatuses 1a and 1b, using data communication, and to display the images on the display 32. Therefore, the user can enjoy a conversation using audio communication, while viewing the images received via the radio apparatuses 1a and 1b.

The following describes operating procedures for the audio communication system shown in FIG. 4. Before starting communication, the user operates the operation unit 26 of the radio apparatus 1a in order to store, to the non-volatile memory 25 (see FIG. 1), information necessary for communication, such as the call sign of the transmission source (the user's own station) and the call signs of the repeater stations.

When starting communication, the user operates the operation unit 26 of the radio apparatus 1a in order to specify the radio station to be called, with the designation of the call sign that has been assigned to the transmission destination radio station in advance and the call sign of the transmission destination repeater.

The information input from the operation unit 26 is provided to the transmission unit 15 by the controller 21, and the transmission unit 15 generates a packet according to an instruction form the controller 21. As shown in FIG. 2, the header part Ph of the packet Pa contains the call sign h3 of the transmission destination repeater, the call sign h4 of the transmission source repeater, the call sign h5 of the transmission destination (the communication party station), and the call sign h6 of the transmission source (the user's own station).

Meanwhile, the image signals captured by the camera 31 of the smartphone 3a are transmitted to the radio apparatus 1a via the USB cable 4a. The image signals input to the terminal 20 of the radio apparatus 1a are transmitted to the transmission unit 15 via the interface unit 19, and are inserted into the data frames d2 of the packet Pa according to the procedures described with reference to FIG. 3.

The packet Pa generated and converted into high-frequency signals by the transmission unit 15 are transmitted via the transmission/reception switching unit 16 and the antenna 17. The radio signal transmitted by the radio apparatus 1a is relayed by the designated repeater station (not shown in the drawings), and reaches the radio apparatus 1b.

The radio signals received by the radio apparatus 1b are provided to the reception unit 18 via the antenna 17 and the transmission/reception switching unit 16, and are demodulated by the reception unit 18, and thus the packet Pa is reproduced. Furthermore, the header part Ph is removed from the packet Pa reproduced by the reception unit 18, and the data part Pd is provided to the audio codec 14 or the interface unit 19, depending on the contents of the data part Pd.

The audio data provided to the audio codec 14 is decoded, and is furthermore converted into an analogue audio signal, and is then provided to the AF amplification unit 13. The audio signal amplified by the AF amplification unit 13 is output from the speaker 12, and thus the voice of the user of the transmission source is reproduced.

Meanwhile, the image signals obtained by demodulating the packet shown in FIG. 3 are provided to the interface unit 19, are transmitted to the smartphone 3b via a Bluetooth communication module (not shown in the drawings), and are displayed on the display 32.

Furthermore, the packet Pa reproduced by the reception unit 18 is provided to the controller 21. The CPU 22 of the controller 21 determines whether or not the packet Pa thus received is a valid packet, by performing an ECC (Error Check Code) check, etc.

The CPU 22 stores, to the RAM 24, the data in the header part Ph of the packet Pa determined to be valid, and also analyzes the information in the header part Ph. According to the results of the analysis, the CPU 22 displays, on the display unit 28, the transmission destination call sign, the transmission source call sign, etc. of the received packet Pa.
Processing for Increasing Communication Speed of Data Communication As described above, radio apparatuses according to the present invention are capable of simultaneously transmitting data for audio communication and data for data communication, but since data for audio communication is preferentially transmitted, the amount of data that can be transmitted as data for data communication is smaller than the amount of data for audio communication.

Therefore, it takes approximately 3 minutes to deliver the image data of a picture with 320×240 pixels, for example, and even if the user attempts to enjoy a conversation while viewing an image captured by the camera 31 of the smartphone 3a connected to one radio apparatus, namely the radio apparatus 1a, by displaying the image on the display 32 of the smartphone 3b connected to the other radio apparatus, namely the radio apparatus 1b, the image signal data cannot be fully delivered within a single call. For this reason, it is not possible to maximize the advantage of the data communication function.

Considering this problem, the present invention increases the communication speed of data communication by, during a fixed time period from when the PTT switch 27 is turned OFF, inserting image signal data into the audio frames d1 of the packet Pa and transmitting the packet Pa.

Figure 5:
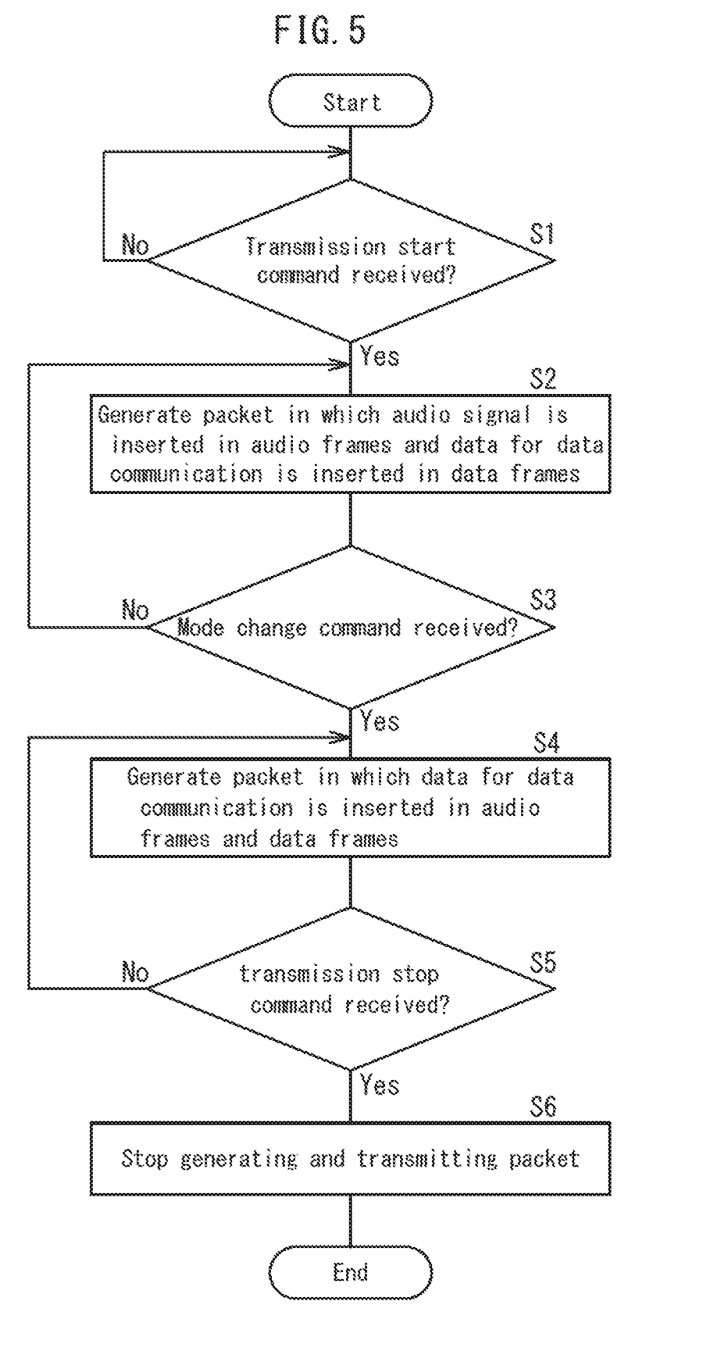
FIG. 5 is a flowchart showing processing performed by a transmission unit from the start to the end of packet transmission.
Figure 6A:
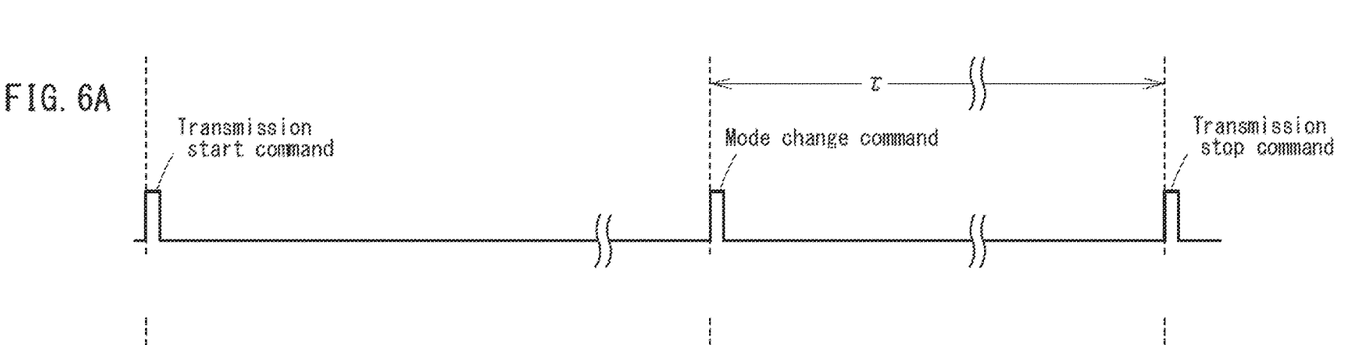
FIG. 6A is a diagram showing a signal transmitted from a controller to the transmission unit during a period from the start to the end of packet transmission.
Figure 6B:
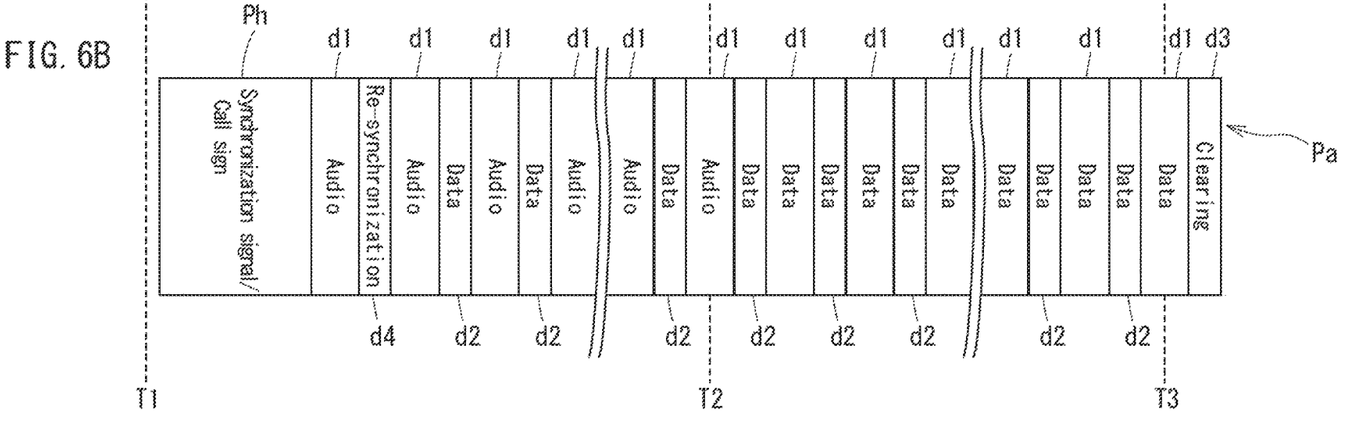
FIG. 6B is a diagram showing the type of data to be transported by a packet.

The following describes the processing for increasing the communication speed of data communication, with reference to the flowchart in FIG. 5 and the time chart in FIG. 6.

FIG. 5 is a flowchart for the process performed by the transmission unit 15 during the period from when the transmission of the packet Pa is started to when it is stopped. Also, FIG. 6 shows the signal transmitted from the controller 21 to the transmission unit 15 and the types of data transmitted via the packet Pa, during the same period.

FIG. 6A shows various sorts of commands that are transmitted from the controller 21 to the transmission unit 15, and FIG. 6B shows the types of data to be inserted into the packet according to the commands. The drawing shows that the timing at which the transmission unit 15 receives a command coincides with the timing at which the generation of the packet is started. In reality, however, there is a short time lag before the generation of the packet.

When the user turns ON the PTT switch 27 in order to transmit audio signals, the controller 21 detects that the PTT switch 27 is turned ON, and as shown in FIG. 6A, a command to start transmission is transmitted from the controller 21 to the transmission unit 15 at time T1. The transmission unit 15, which has received the command (Yes in step Si), starts generating the packet Pa (step S2).

Specifically, as shown in FIG. 6B, the transmission unit 15 generates the packet Pa in which audio signal data is inserted in the audio frames d1, and data for data communication is inserted in the data frames d2. The packet Pa thus generated is converted into high-frequency signals by the transmission unit 15, which are transmitted as radio signals from the antenna 17.

Subsequently, when the call ends and the user turns OFF the PTT switch 27, the controller 21 detects that the PTT switch 27 is turned OFF, and, as shown in FIG. 6B, transmits a command to change the mode of the packet, to the transmission unit 15 at time T2.

The transmission unit 15, which has received the packet mode change command from the controller 21 (Yes in step S3), waits until the boundary between the audio signal data and data for data communication is reached, and inserts data for data communication into the audio frames d1 and the data frames d2 (step S4). The right half of FIG. 6B shows that data for data communication is inserted into all of the audio frames d1 and all of the data frames d2 of the packet Pa.

As described with reference to FIG. 3, when audio communication and data communication are simultaneously performed, data for data communication is divided into 5-byte portions, and these portions, as well as the mini-header d5, are inserted into two data frames d2.

Meanwhile, when only data communication is performed, data for data communication is divided into 20-byte portions, and the mini-header d5 and so on is added to each portion so as to compose a block, and the data of the block is divided and inserted into two adjacent audio frames d1 and two adjacent data frames d2.

Specifically, each block is 24-byte data composed of 20-byte data for data communication, a 1-byte mini-header, 2-byte unique data to be inserted into each audio frame for noise reduction, and 1-byte data to be inserted into data frames in order to prevent the misdetection of packet loss, and this data block is divided and inserted into two adjacent audio frames d1 (9 bytes×2) and two adjacent data frames d2 (3 bytes×2).

At time T3, which is the time point at which a fixed time period τ has elapsed since time T2, the controller 21 transmits, to the transmission unit 15, a command to stop transmission. Upon receipt of the transmission stop command (Yes in step S5), the transmission unit 15 inserts the clearing frame d3 into the packet Pa, and stops generating and transmitting the packet Pa (step S6). After that, the radio apparatus 1 enters the state of being able to receive radio signals from another radio apparatus.

As shown in FIG. 6B, during the period from time T1, at which the transmission unit 15 receives the transmission start command, to time T2, at which the transmission unit 15 receives the mode change command, audio signal data is inserted into the audio frames d1. After that, until time T3, which is the time point at which the fixed time period τ has elapsed since time T2, image signal, i.e., data for data communication, is inserted into the audio frames d1, and the clearing frame d3 is inserted in the end of the packet. Therefore, the amount of data for data communication that can be transported by a single packet is increased, which results in the increase of the communication speed of data communication.

When a comparison is made between the case in which the audio signal data is inserted into the audio frames d1 of the packet Pa and the case in which the data for data communication is inserted into the same, the communication speed of data communication in the latter case is approximately 3.5 times faster than the communication speed in the former case, and thus the amount of data for data communication that can be transmitted during a single call can be greatly increased.

Next, a description is given of a data reproduction method for a radio apparatus (the communication party station) that has received radio signals generated according to the procedure shown in FIG. 5 and transmitted by a radio apparatus (the user's own station). The controller 21 processes the packet Pa according to the flowchart shown in FIG. 7.

Figure 7:
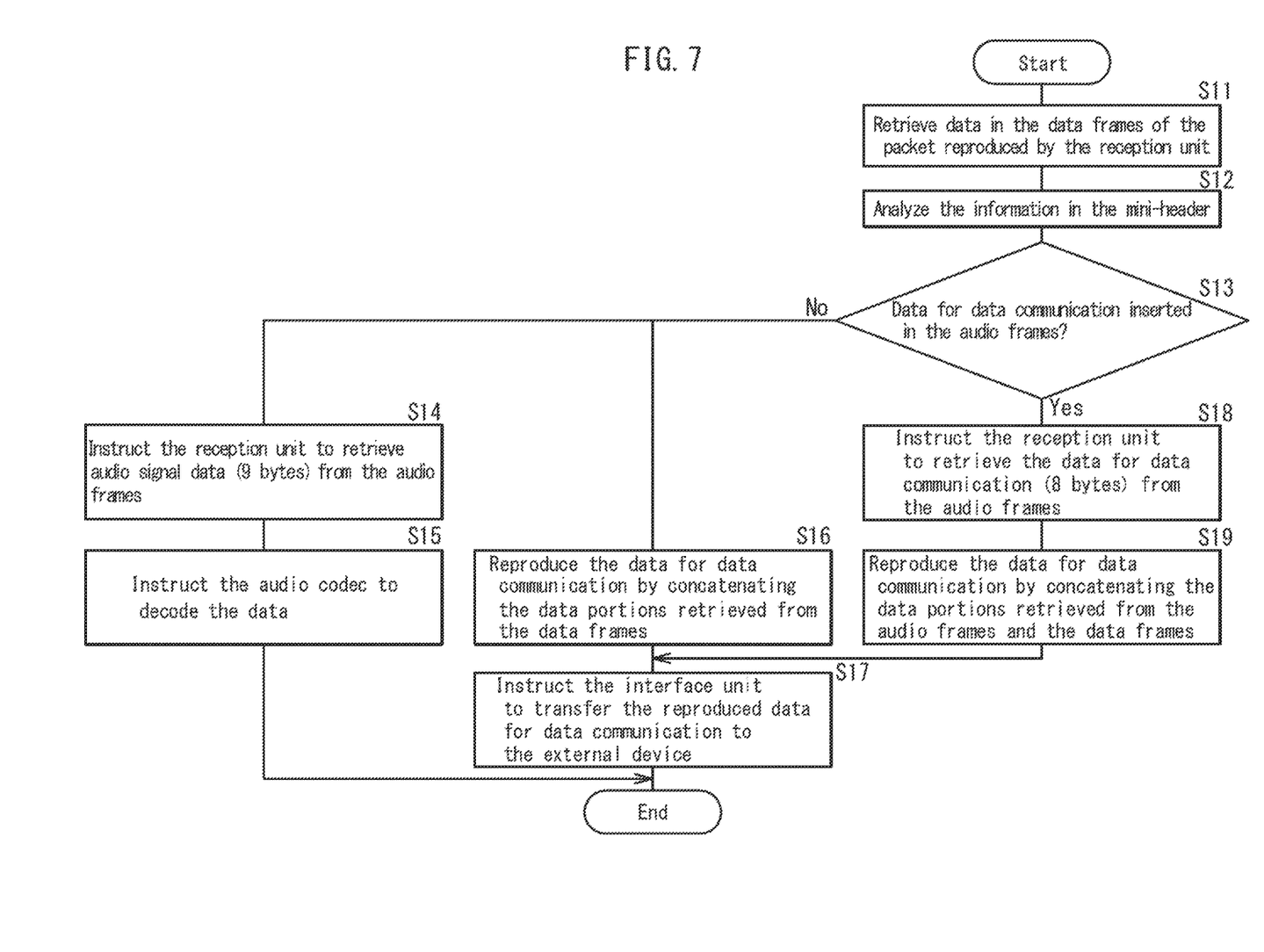
FIG. 7 is a flowchart showing processing performed by the controller of the radio apparatus that has received a packet.

The controller 21 retrieves the data in the data frames d2 from the data of the packet Pa, which has been reproduced by the reception unit 18 from the radio signals, and then writes it into a built-in register (not shown in the drawings) (step S11). The controller 21 analyzes the information in the mini-header d5, and determines whether or not data for data communication has been inserted in the audio frames d1 (step S12).

As shown in FIG. 6B, audio signals are inserted in the audio frames d1 of the packet Pa that have been transmitted until time T2. When determining that the audio signal data is inserted in the audio frames d1 (No in step S13), the controller 21 instructs the reception unit 18 to retrieve the data (9 bytes in this embodiment) contained in the audio frames d1 (step S14).

The audio signal data retrieved from the reception unit 18 and concatenated is decoded and subjected to D/A conversion by the audio codec 14 according to an instruction from the controller 21, is thus reproduced as analogue audio signals (step S15), and then the analogue audio signals are output as audio from the speaker 12.

In parallel with steps S14 and S15, the controller 21 concatenates the data portions retrieved from the data frames d2 and stored in the register, thereby reproducing the data for data communication (step S16). The data for data communication thus reproduced is output to the interface unit 19.

Next, the controller 21 instructs the interface unit 19 to transfer the reproduced data for data communication to the external device (step S17), and the interface unit 19 outputs the reproduced data for data communication to the external device according to the instruction.

Meanwhile, data for data communication is inserted in the audio frames d1 of the packet Pa that have been transmitted at or after time T2. When determining that the data for data communication is inserted in the audio frames d1 (Yes in step S13), the controller 21 instructs the reception unit 18 to retrieve the data for data communication (8 bytes in the present embodiment) from the audio frames d1, while excluding data for noise reduction (1 byte in the present embodiment) from the audio frames d1 (step S18).

Next, the controller 21 concatenates the data portions retrieved from two adjacent audio frames d1 and two adjacent data frames d2 in reverse order to how the block is created as described above, thereby reproducing the concatenated data for data communication (step S19). The data for data communication thus reproduced is output to the interface unit 19.

Next, the controller 21 performs the processing in the above-described step S17, in other words instructs the interface unit 19 to transfer the reproduced data for data communication to the external device (not shown in the drawings), and the interface unit 19 outputs the reproduced data for data communication to the external device according to the instruction.

In the embodiment above, the extension time period τ is preferably within the range of 1 second to 10 seconds. If the extension time period τ is too short, the communication speed does not differ very much from the conventional speed, and if the extension time period τ is too long, the conversation is prevented from being smooth because audio signals from the communication party station cannot be received during this period.

Also, when the data for data communication transmitted from the external device runs out before the elapse of the fixed time period τ, the controller 21 detects the fact, and the transmission stop command described above is transmitted to the transmission unit 15. The transmission unit 15 stops generating and transmitting the packet according to the same procedures as described above. Needless to say, the mode change command is transmitted from the controller 21 when data for data communication to be transmitted remains when the PTT switch 27 is turned OFF.

Also, although the usage mode in which a smartphone is connected to a radio apparatus and image signals are exchanged between a pair of smartphones is described in the embodiment above, the external device to be connected to the radio apparatus is not limited to a smartphone. For example, a portable information device such as a tablet terminal may be connected to the radio apparatus, and image signals, text data, etc., may be exchanged between the smartphone and the tablet terminal, etc.

The following summarizes preferable examples of the embodiment of the present invention.

During the fixed time period, it is preferable that information indicating that data for data communication is inserted in the audio frames is written in the mini-header.

Also, during the fixed time period, it is preferable that the transmission unit stops generating the packet when the data for data communication to be inserted in the audio frames and data frames runs out.

Although the present invention has been fully described by way of example with reference to the accompanied drawings, it is to be understood that various changes and modifications will be apparent to those skilled in the art.

Therefore, unless otherwise such changes and modifications from the scope of the present invention hereinafter defined, they should be construed as being included therein.

What is claimed is:

1. A radio communication system including at least two radio apparatuses, each radio apparatus comprising:
   a transmission unit configured to generate a packet including: a header part containing data of an identifier identifying at least a transmission destination radio station and a transmission source radio station; and a data part in which an audio frame and a data frame, each having a predetermined length, are consecutively arranged one after another, the data frame further having a mini-header inserted therein, in which information indicating a type of data is written, and to convert the packet into a radio signal and transmit the radio signal;
   a reception unit configured to receive the radio signal, reproduce a packet from the radio signal, and retrieve data from the packet;

an audio codec configured to generate a digital audio signal by performing A/D conversion and encoding on an analogue audio signal and thereafter transmit the digital audio signal to the transmission unit, and to reproduce an analogue audio signal by performing decoding and D/A conversion on a digital audio signal received from the reception unit; and a controller configured to instruct the transmission unit to generate a packet, and to instruct the reception unit to reproduce a packet from a received radio signal, wherein, when receiving from the controller a first command to start transmission, the transmission unit of a radio apparatus serving as a sender generates a packet in which data of an audio signal output from the audio codec is inserted in the audio frame and data for data communication is inserted in the data frame, when receiving from the controller a second command to change a mode of a packet in response to an end of a call, the transmission unit of the radio apparatus serving as the sender generates, during a fixed time period from reception of the second command, a packet in which data for data communication is inserted in the audio frame and the data frame, the controller of a radio apparatus serving as a recipient, which has received a radio signal, analyzes the information inserted in the mini-header retrieved from the packet reproduced by the reception unit, to determine the type of data inserted in the audio frame, and the reception unit retrieves data from the packet according to a result of the determination made by the controller, and reproduces the audio signal or the data for data communication.

2. The radio communication system according to claim 1, wherein, during the fixed time period, the transmission unit writes, in the mini-header, information indicating that data for data communication is inserted in the audio frame.

3. The radio communication system according to claim 1, wherein, during the fixed time period, the transmission unit stops generating the packet when data for data communication to be inserted in the audio frame and the data frame runs out.

4. A radio apparatus comprising:

a transmission unit configured to generate a packet including: a header part containing data of an identifier identifying at least a transmission destination radio station and a transmission source radio station; and a data part in which an audio frame and a data frame, each having a predetermined length, are consecutively arranged one after another, the data frame further having a mini-header inserted therein, in which information indicating a type of data is written, and to convert the packet into a radio signal and transmit the radio signal;

an audio codec configured to generate a digital audio signal by performing A/D conversion and encoding on an analogue audio signal and thereafter transmit the digital audio signal to the transmission unit; and a controller configured to instruct the transmission unit to generate a packet, wherein, when receiving from the controller a first command to start transmission, the transmission unit generates a packet in which data of an audio signal output from the audio codec is inserted in the audio frame and data for data communication is inserted in the data frame, and when receiving from the controller a second command to change a mode of a packet in response to an end of a call, the transmission unit generates, during a fixed time period from reception of the second command, a packet in which data for data communication is inserted in the audio frame and the data frame.

5. The radio apparatus according to claim 4, further comprising a reception unit configured to receive the radio signal, reproduce a packet from the radio signal, and retrieve data from the packet, wherein the controller analyzes the information inserted in the mini-header retrieved from the packet reproduced by the reception unit, to determine the type of data inserted in the audio frame, and the reception unit retrieves data from the packet according to a result of the determination made by the controller, and reproduces the audio signal or the data for data communication.

6. A radio communication method for a radio communication system including at least two radio apparatuses, one of the radio apparatuses being configured to generate a packet including: a header part containing data of an identifier identifying at least a transmission destination radio station and a transmission source radio station; and a data part in which an audio frame and a data frame, each having a predetermined length, are consecutively arranged one after another, the data frame further having a mini-header inserted therein, in which information indicating a type of data is written, and to convert the packet into a radio signal and transmit the radio signal, and another one of the radio apparatuses being configured to receive a radio signal and reproduce a packet from the radio signal, the radio communication method comprising the steps of:

with a radio apparatus serving as a sender,
when transmission starts, generating a packet in which data of an audio signal is inserted in the audio frame and data for data communication is inserted in the data frame;
during a fixed time period from when a call ends, generating a packet in which data for data communication is inserted in the audio frame and the data frame; and
converting the generated packet to a radio signal and transmitting the radio signal, and with a radio apparatus serving as a recipient,
receiving the radio signal;
reproducing a packet from the received radio signal;
analyzing the information inserted in the mini-header retrieved from the reproduced packet to determine the type of data inserted in the audio frame; and
retrieving data from the packet according to a result of the determination, and reproducing the audio signal or the data for data communication.

7. A packet generation method for a radio apparatus that communicates with another radio apparatus by using a packet including: a header part containing data of an identifier identifying at least a transmission destination radio station and a transmission source radio station; and a data part in which an audio frame and a data frame, each having a predetermined length, are consecutively arranged one after another, the data frame further having a mini-header inserted therein, in which information indicating a type of data is written, the packet generation method comprising the steps of:

when transmission starts, generating a packet in which data of an audio signal is inserted in the audio frame and data for data communication is inserted in the data frame; and during a fixed time period from when a call ends, generating a packet in which data for data communication is inserted in the audio frame and the data frame.

8. A method for reproducing data from a packet performed by a radio apparatus configured to receive a radio signal containing a packet generated by the packet generation method according to claim 7, to reproduce the packet from the radio signal, and to retrieve data from the packet, the method comprising the steps of:

analyzing the information inserted in the mini-header retrieved from the reproduced packet to determine the type of data inserted in the audio frame; and retrieving data from the packet according to a result of the determination and reproducing the audio signal or the data for data communication.

* * * * *